(12) United States Patent
Sanchez et al.

(10) Patent No.: US 8,620,489 B2
(45) Date of Patent: Dec. 31, 2013

(54) ROBOTIC DRIVE SYSTEM MODULARITY

(75) Inventors: Russell Irvin Sanchez, Seattle, WA (US); Efstathios Papaefstathiou, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 502 days.

(21) Appl. No.: 12/978,506

(22) Filed: Dec. 24, 2010

(65) Prior Publication Data
US 2012/0165977 A1 Jun. 28, 2012

(51) Int. Cl.
*B25J 5/00* (2006.01)

(52) U.S. Cl.
USPC ............. 701/2; 700/245; 901/1; 318/568.12

(58) Field of Classification Search
USPC ............. 701/1, 2; 700/245; 901/1; 180/198; 318/568.12
See application file for complete search history.

(56) References Cited

U.S. PATENT DOCUMENTS

| | | | |
|---|---|---|---|
| 4,829,840 A | 5/1989 | Torii et al. | |
| 6,068,073 A | 5/2000 | Roston et al. | |
| 6,438,456 B1 * | 8/2002 | Feddema et al. | 700/245 |
| 6,491,127 B1 * | 12/2002 | Holmberg et al. | 180/252 |
| 6,836,701 B2 * | 12/2004 | McKee | 700/245 |
| 7,011,171 B1 | 3/2006 | Poulter | |
| 7,066,291 B2 * | 6/2006 | Martins et al. | 180/167 |
| 7,082,350 B2 * | 7/2006 | Skoog | 700/245 |
| 7,668,621 B2 * | 2/2010 | Bruemmer | 700/245 |
| 7,784,570 B2 * | 8/2010 | Couture et al. | 180/9.1 |
| 8,073,564 B2 * | 12/2011 | Bruemmer et al. | 700/245 |
| 8,271,132 B2 * | 9/2012 | Nielsen et al. | 700/250 |
| 2007/0219666 A1 * | 9/2007 | Filippov et al. | 700/245 |
| 2009/0266628 A1 | 10/2009 | Schempf et al. | |
| 2009/0314554 A1 * | 12/2009 | Couture et al. | 180/8.7 |

OTHER PUBLICATIONS

Ben-Tzvi et al, Articulated Hybrid Mobile Robot Mechanism with Compounded Mobility and Manipulation and On-Board Wireless Sensor/Actuator Control, Mechatronics, vol. 20, Iss. 5, Sep. 2010, pp. 627-639.*
Unsal, et al., "I(CES)-cubes: a modular self-reconfigurable bipartite robotic system", Retrieved at <<http://www.cs.cmu.edu/~unsal/publications/spie99.pdf>>, In Proceedings of SPIE, vol. 3839: Sensor Fusion and Decentralized Control in Robotic Systems II, Sep. 19-20, 1999, Boston, Massachusetts, USA, pp. 258-269.
Daltorio, et al., "A small wall-walking robot with compliant, adhesive feet", Retrieved at <<http://ieeexplore.ieee.org/xpl/freeabs_all.jsp?arnumber=1545596>>, Dec. 5, 2005, pp. 6.
"iClebo Home Robot Vacuum", Retrieved at <<http://www.robotshop.ca/iclebo-home-robot-vacuum.html>>, Retrieved on Sep. 20, 2010.
"Modern multi-functional robot", Retrieved at <<http://en.rian.ru/infographics/20100519/159079654.html>>, Sep. 21, 2010, pp. 2.

* cited by examiner

*Primary Examiner* — Russell Frejd
(74) *Attorney, Agent, or Firm* — Gonzalez Saggio & Harlan LLP

(57) ABSTRACT

The subject disclosure is directed towards a robot device including a computational intelligence system that can be coupled to/decoupled from different interchangeable mobility mechanisms at different times. The robot may operate with its intelligence portion detached from the mobility portion, whereby the intelligence portion may be easily to interact therewith out lifting the (typically dirty) mobility mechanism. The robot may operate according to a coupled state, a decoupled state, or in a transition state when being moved for purposes of coupling or decoupling.

20 Claims, 8 Drawing Sheets

ROBOTIC DRIVE SYSTEM MODULARITY

BACKGROUND

A robot is a complex assembly of sensory awareness, computational intelligence, and mobility. Sensory and intelligence systems can be easily designed for broad applications, similar to a computer system that can run various applications. Mobility drive systems, however, are typically highly specialized for specific environments.

To optimize maneuverability and stability, and to present a non-threatening appearance, a home consumer robot typically needs to be small (approximately toddler-sized). As a result, the stature of a home consumer robot is (typically) substantially shorter than a standing adult. When a user wants to interact with such a robot at a more convenient level, something closer to eye level, it is desirable for the user to be able to lift that robot onto a countertop or tabletop. However, a robot's drive system collects dirt and dust, and the robot can be heavy, making the lifting operation undesirable in many instances.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a robot device includes a computational intelligence system that can be coupled to/decoupled from different interchangeable mobility mechanisms at different times, making the intelligence portion of the robot detachable from the mobility portion. The robot may drive a mobility mechanism when coupled to such a mobility mechanism, or operate in a stationary state, including to output information to a human via an interface, when decoupled from any mobility mechanism. A sensor set provides one or more signals to the computational intelligence system by which the computational intelligence system detects whether a mobility mechanism is coupled or not. In one aspect, the sensor set provides signals to detect when the robot is being carried.

In one aspect, the detachable computational intelligence system (e.g., contained in a lightweight housing) is dimensioned to be lifted up by a human of reasonable strength for placing upon an elevated surface. Not only does the detachability facilitate lifting by reducing the amount of weight, but also facilitates lifting because the mobility portion, which is typically dirty, remains on the ground whereby only the computational intelligence system needs be placed on a table, counter, chair or the like to raise it closer to eye level.

In one aspect, the robot operates differently depending on its current state, e.g., coupled, decoupled or in transition. For example, the robot device may disable any controlled movement of its housing, gesture input may be disabled, and so forth when in the transition state.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a robot device that includes a detachable, modular/interchangeable drive mechanism, by which the robot may function as a static device, or a mobile device that changes its type of locomotion for movement over various terrains/other purposes as needed. The robot device thus is able to be adapted to different environments and change its operating functionality depending on what drive mechanism hardware is attached. Not only does the modularity of the drive mechanism facilitate flexibility and extensibility with respect to different types of mobility, but the detachability of the drive mechanism makes the computational intelligence system of the robot removable, whereby it is physically lighter in weight for lifting and shorter in height, as well as cleaner because only the drive mechanism contacts the terrain.

It should be understood that any of the examples herein are non-limiting. For example, various models and the like are used as examples herein, however other models than those exemplified may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in robotic technology in general.

Figure 1A:
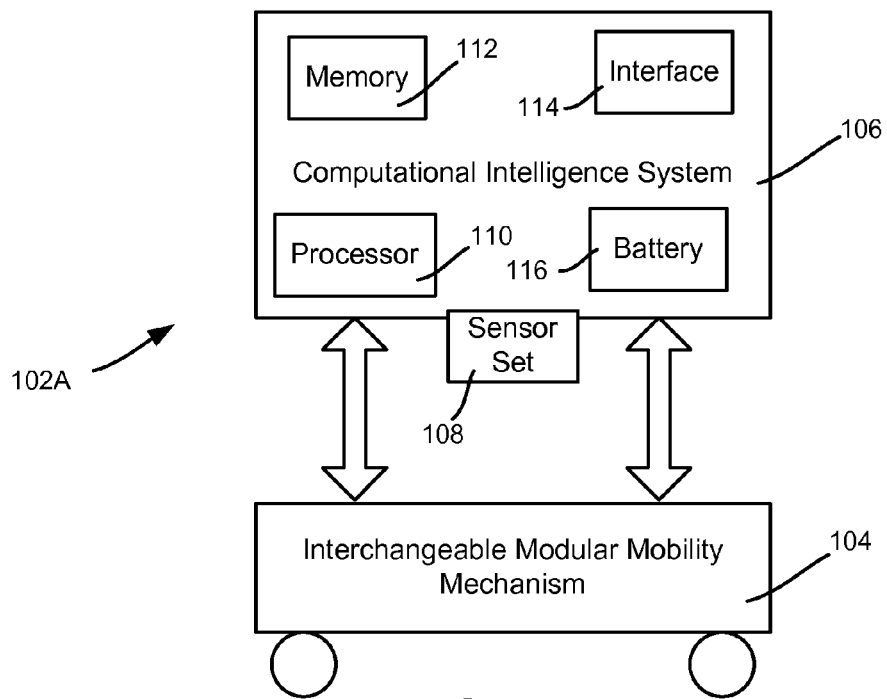
FIGS. 1A-1C are block diagrams representing example embodiments of a robotic device in which a computational intelligence system of the robotic device may be coupled and decoupled from a mobility mechanism of the robotic device.
Figure 1B:
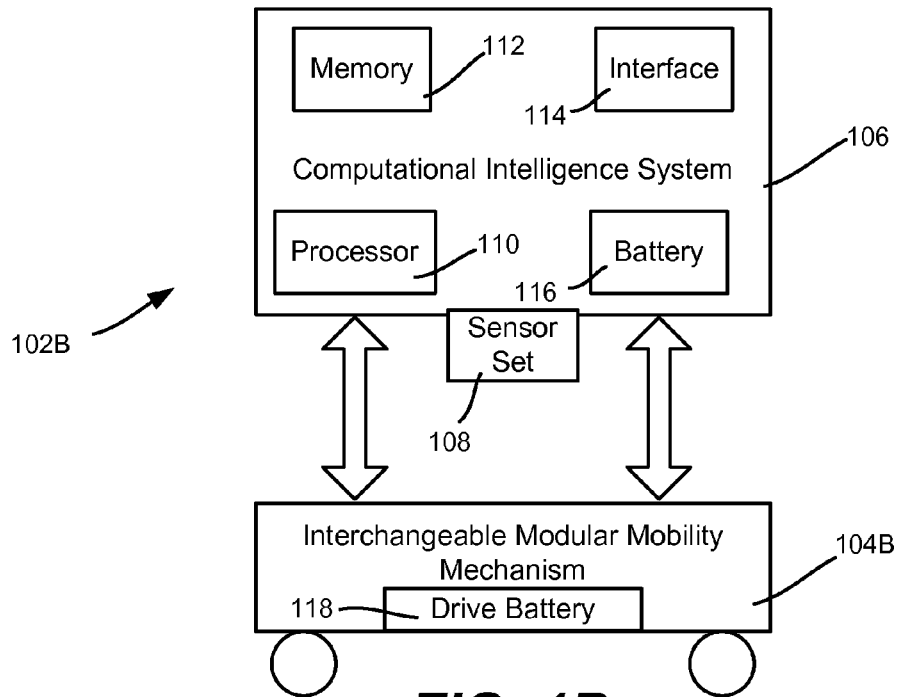
Figure 1C:
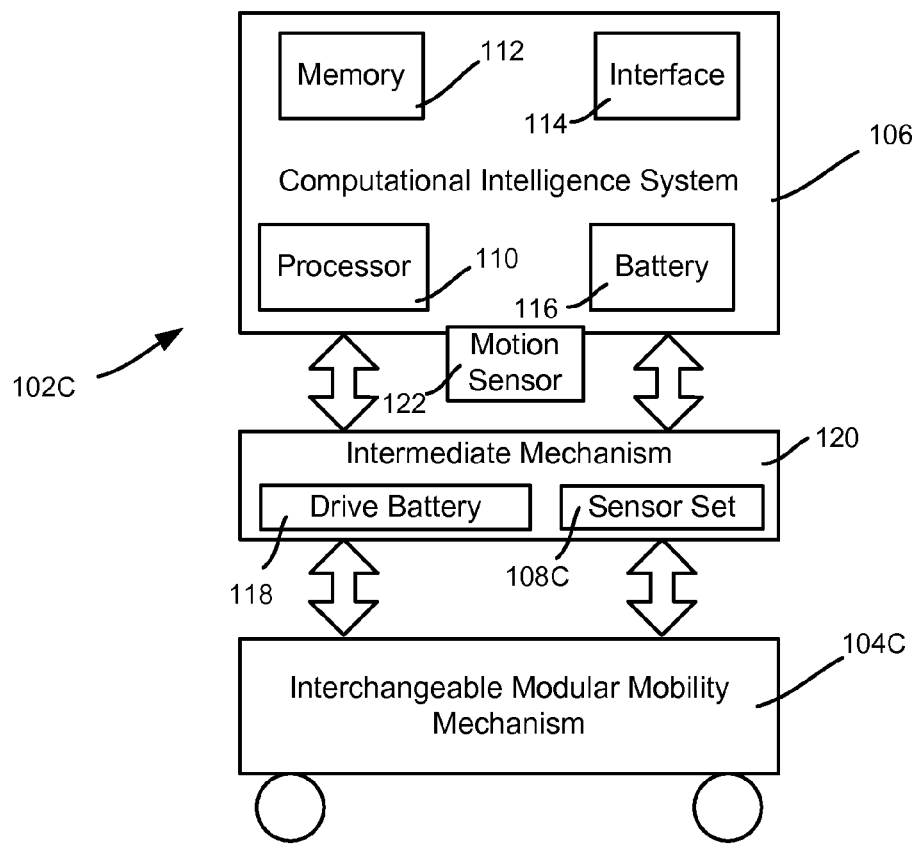

FIGS. 1A-1C are block diagrams representing some example alternative implementations of a robot device 102A-102C, respectively, configured for mobility via an interchangeable/modular mobility (drive) mechanism 104. In FIG. 1A, a computational intelligence system 106 couples to (e.g., mounts atop) the mobility mechanism 104. This provides mobility to the robot device 102 so that the computational intelligence system 106 is able to be transported over one or more kinds of terrain, based upon instructions from the computational intelligence system 106. Not only is terrain a consideration, but different mobility mechanisms may address other, different mobility needs, such as top speed, precision, durability, weight, long distance, endurance, and so forth, for example.

In general, a sensor set 108 comprising one or more sensors provides the computational intelligence system 106 with one or more signals to indicate the robot device's current state. This includes one or more signals used for detecting when the computational intelligence system 106 is coupled to the mobility mechanism 104 and when it is decoupled. The sensor set may include any mechanical, electrical, optical and/or magnetic sensor or sensors, such as a sensor that detects a latch mechanism that couples/decouples the mobility mechanism. Also, as described below, there are different types of interchangeable modular mobility mechanisms, and then sensor set 108 may provide mechanism-specific information whereby the computational intelligence system 106 knows which type of mobility mechanism is currently coupled to it.

The computational intelligence system 106 includes a processor 110, memory 112 and interface 114. In the implementation shown in FIG. 1A, the computational intelligence system 106 also includes a device battery 116 (or other suitable portable power source).

FIG. 1B is similar to FIG. 1A, and thus is not described again except to note that the modular mobility mechanism 104B includes its own, separate drive battery 118. The battery may be pluggable into different modular mobility mechanisms to allow sharing, recharging one while using another, and so forth. As will be understood, the computational intelligence system 106 is designed to be relatively light, and thus having a separate drive battery 118 in the modular mobility mechanism 104B allows the computational intelligence system's battery 116 to be appreciably smaller/lighter. Note that the computational intelligence system 106 may draw power from the drive battery 118 when coupled to the mobility mechanism 104B, however the computational intelligence system 106 remains operational when decoupled, and thus uses the battery 116 at least as an auxiliary power source when decoupled.

FIG. 1C is another implementation that is generally similar in the computational intelligence system 106 and mobility mechanism 104C aspects, however in this implementation, the computational intelligence system 106 and mobility mechanism 104C coupled together via an intermediate mechanism 120. In this example, the intermediate mechanism includes the drive battery 118, whereby different mobility mechanisms are able to share the same drive battery (even if not pluggable) and possibly other shared components, such as a motor, gears and so forth. Note that at least part of the sensor set 108C is able to detect when all components 106, 104C and 120 are coupled, and for purposes of simplicity the sensor set 108C is shown in the intermediate mechanism, even though the sensor set 108C may only have a conductor or the like extending through the intermediate mechanism 120 that completes a circuit when all are coupled, for example. Also, at least part of the sensor set includes a motion sensor 122 that detects when the computational intelligence system is moving (e.g., vertically), such as when transitioning from a coupled state to a decoupled state. One way to do this is by having the motion sensor 122 physically coupled to the computational intelligence system 106, as generally represented in FIG. 1C; other ways are feasible, however, such as to machine vision process a camera's captured frames to determine such vertical motion. Note that "motion sensor" includes the concept of conventional motion sensors as well as other sensor types, for example a proximity sensor detecting distance from the surface (floor or table), an accelerometer, a gyroscope and so forth.

Figure 2:
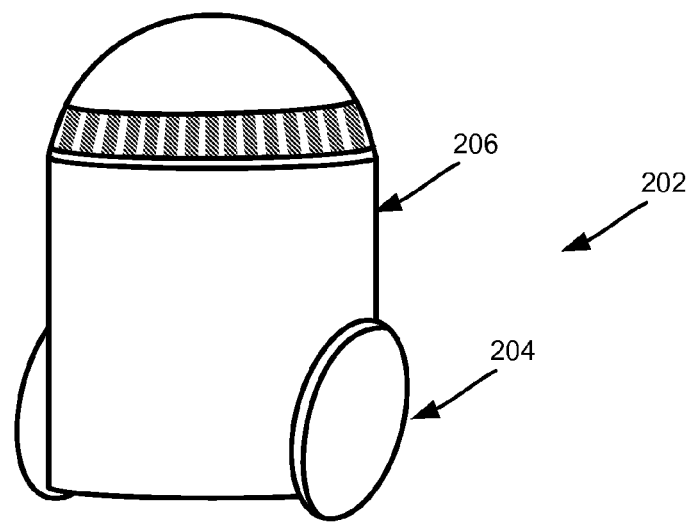
FIG. 2 is a representation of a robot device coupled to a wheel-type mobility system.
Figure 3:
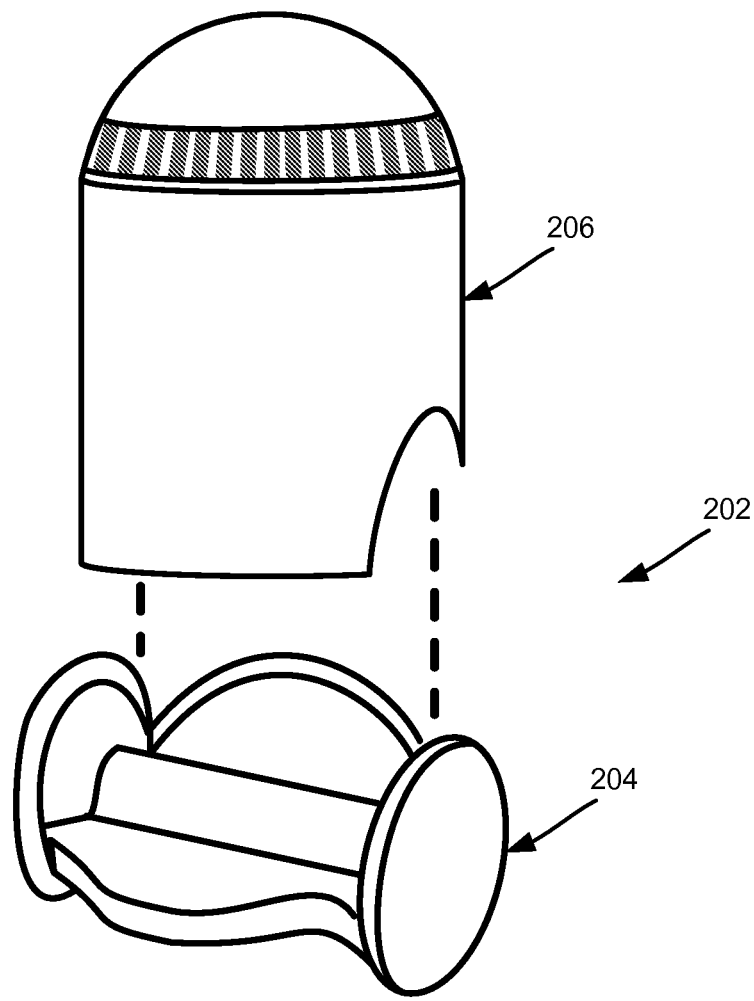
FIG. 3 is a representation of a robot device decoupled from a wheel-type mobility system.

FIGS. 2 and 3 represent the detachability of one example embodiment of a robot device 202 with the modular mobility mechanism 104 in a wheel-based embodiment 204, and the computational intelligence system 106 in a detachable upper housing 206. FIG. 2 shows the coupled state, while FIG. 3 shows the decoupled state. As described below, the computational intelligence system 106 remains operational in the decoupled state.

Figure 4:
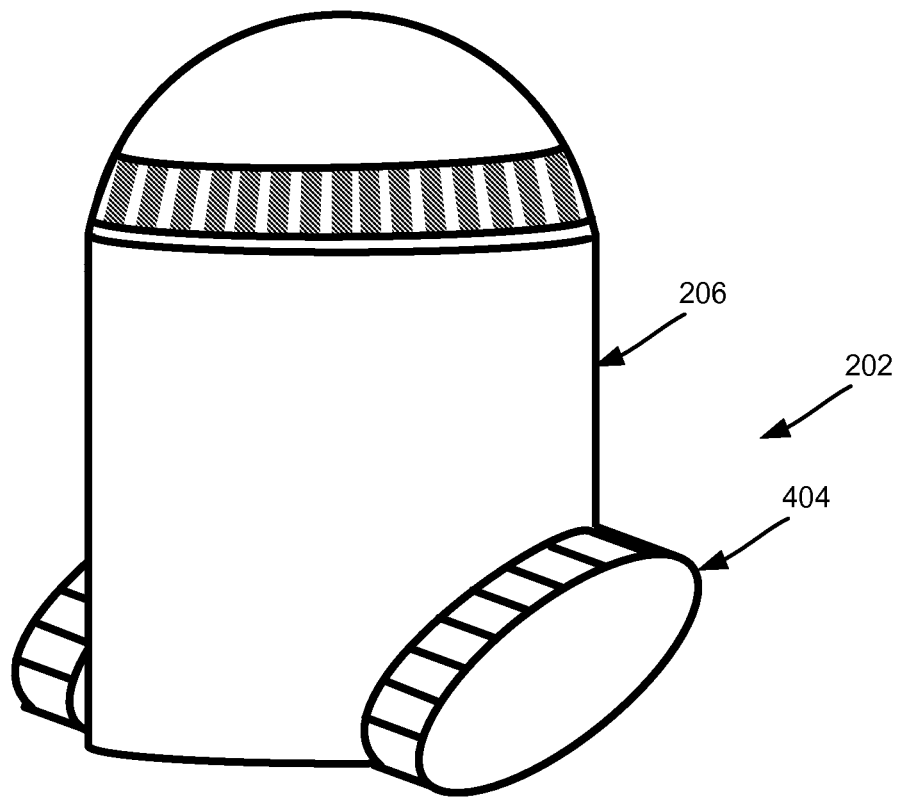
FIG. 4 is a representation of a robot device coupled to a tread-type mobility system.

FIGS. 2 and 4 represent the interchangeable/nodular nature of the mobility mechanisms, with the modular mobility mechanism in the wheel-based embodiment 204 of FIG. 2, and in an alternative tread-based embodiment 404 of FIG. 4. The same computational intelligence system 106 in the detachable upper housing 206 may be coupled to either mobility mechanism 204 or 404, as well as other types of mobility mechanisms (e.g., arranged for climbing stairs or other such terrain). Note further that a different computational intelligence system 106 may be used with the mobility mechanisms, e.g., one with more computational power, one with different applications, and so forth.

Figure 5:
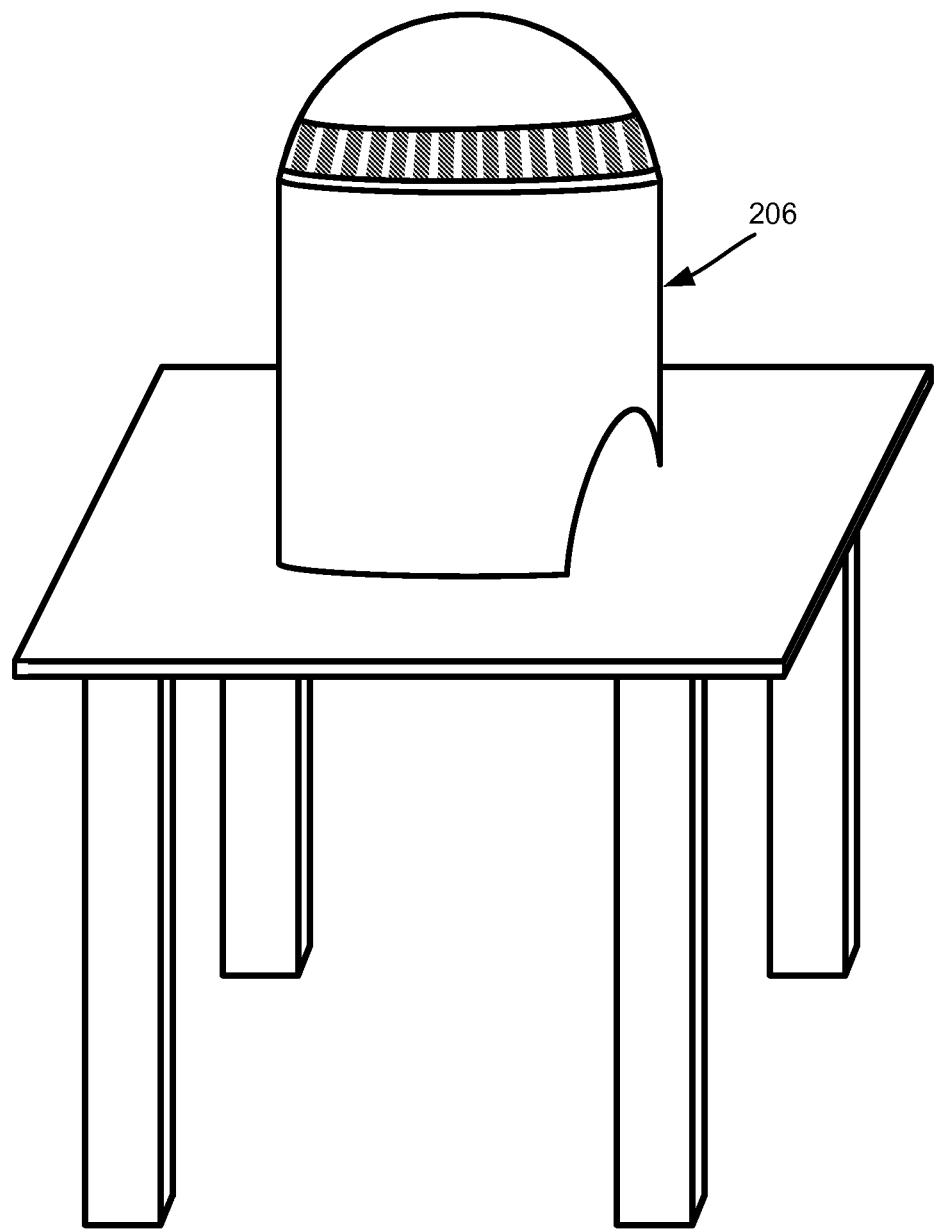
FIG. 5 is a representation of a robot device decoupled from any mobility system and placed on a surface where the robot device may continue to operate in a decoupled state.

FIG. 5 represents another desirable aspect of the robot device, namely that in the decoupled state, the computational intelligence system 106 in the detachable upper housing 206 may be placed on an elevated surface such as a table, counter or chair for interaction with a human. As mentioned above, the robot's size is intended to be non-intimidating, such as the size of a toddler, but is ordinarily no more than three or possibly four feet in height. The housing 206 with the contained computational intelligence system 106 is ordinarily far cleaner than any mobility mechanism, and is also shorter and lighter (e.g., a few pounds at most, ordinarily not more than twenty) without a mobility mechanism coupled thereto, making lifting into an elevated position more desirable and easy for a human of reasonable strength.

Figure 6:
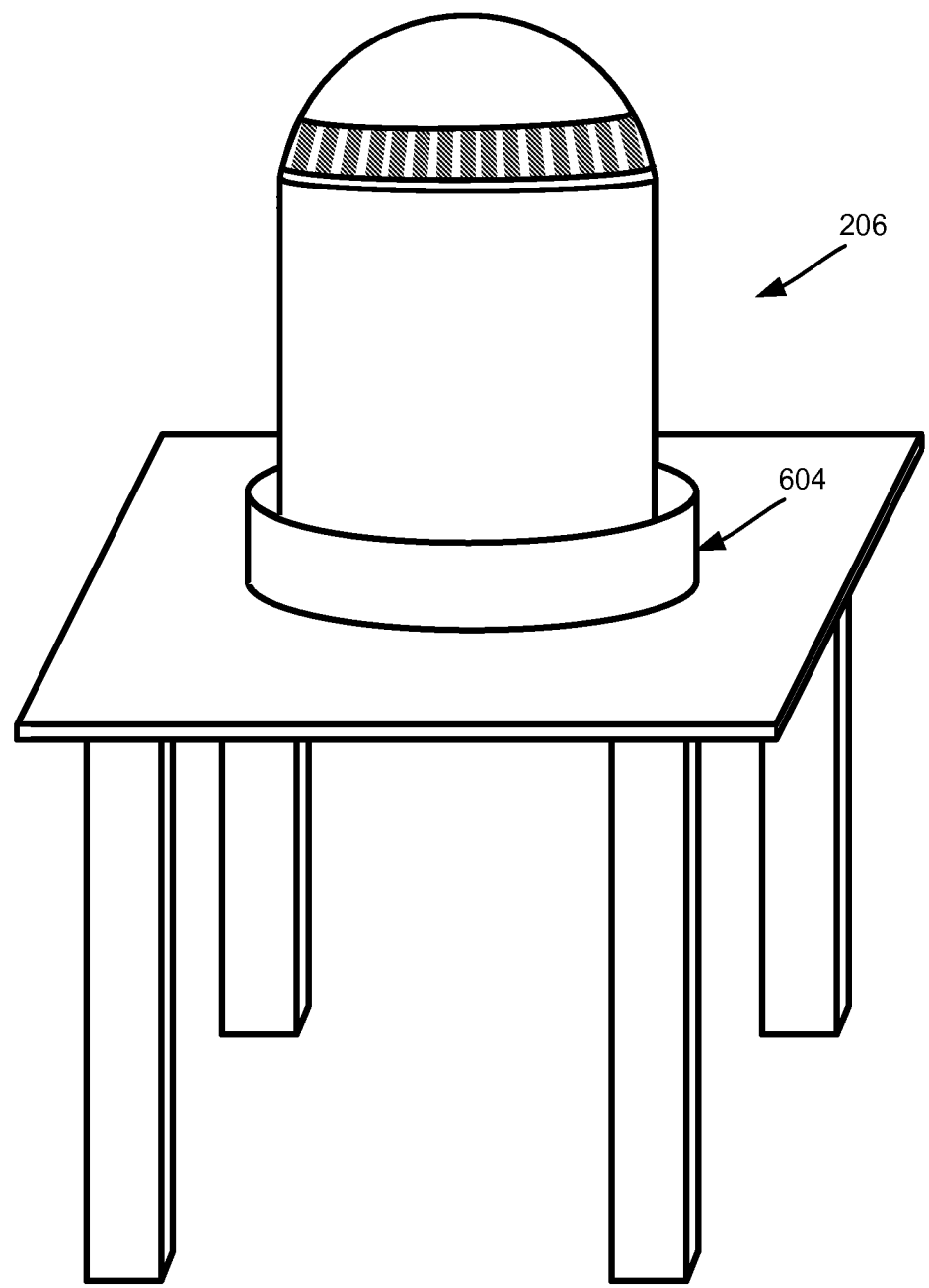
FIG. 6 is a representation of a robot device coupled to a tabletop mobility base where the robot device may continue to operate.

FIG. 6 is a representation of another alternative, namely the housing 206/computational intelligence system 106 of the robot being placed in a tabletop "mobility" base 604. The tabletop mobility base 604 is an alternative base with limited mobility, such as only a rotational axis of mobility, for example (or possibly some vertical movement). The tabletop mobility base 604 may be placed on a tabletop, countertop, or chair. When placed in the mobility base 604, the computational intelligence system may rotate to face multiple participants in a conversation, for example, with the base 604 also optionally configured to provide power and/or charge the battery of the computational intelligence system 106.

Figure 7:
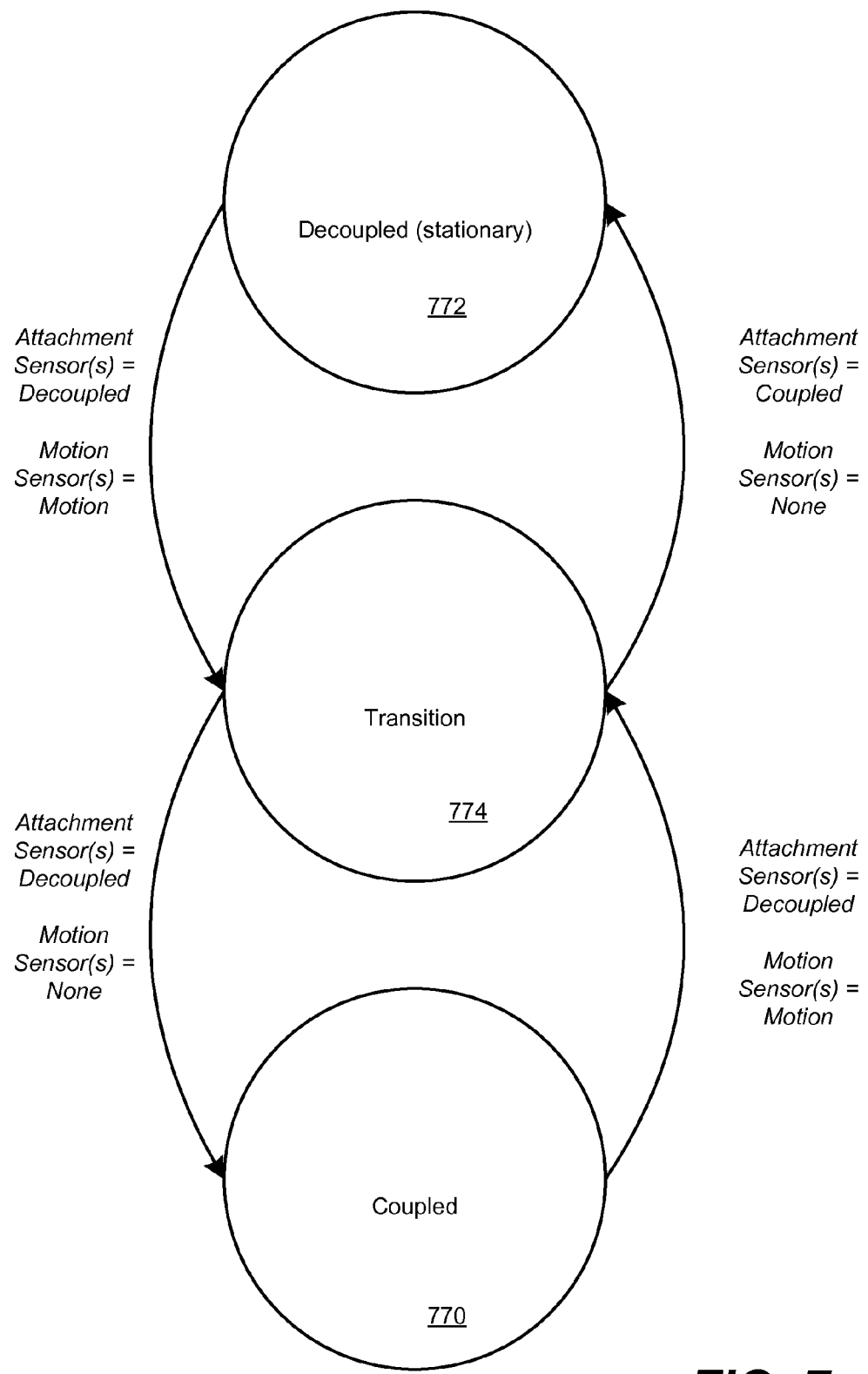
FIG. 7 is a state diagram representing example states in which a robotic device may operate.

FIG. 7 is a state diagram showing example states of the robot device, namely coupled 770 in which the computational intelligence system 107 is coupled to a mobility mechanism, decoupled 772 therefrom, or in a transition state 774. Note that these states may correspond to the sensor states indicated in FIG. 7.

The robot device operates differently when in these states. Some example operating differences of one embodiment are described herein; these are non-limiting examples, may or may not be present in a given implementation, and other example operating differences may exist in a given implementation.

When the robot is lifted vertically and the sensor set also indicates the computational intelligence system and mobility mechanism are decoupled, the robot device is in the transition state 774. In the transition state 774, robot motion is paused and disabled, including head rotation and tilt, projector, drive systems and other. One or more types of input/interaction may be disabled, such as gesture and/or touch-sensitive input, however speech and remote control input continue normally. Note that one type of remote control input is referred to as "pendant" input, because the user may wear the remote control around the neck in one embodiment of a remote control.

Lifting the robot does not change its mode (e.g., engaged with a person, running in a self-directed operation, and so forth). However, if the robot was performing a task involving motion (which may correspond to self-directed operation), such as performing navigation, head rotation, projector rotation, and so forth, then that motion is suspended and the task is paused. Applications that are running on the robot may individually determine how this task pausing is handled.

If the robot was engaged with a person (or possibly another robot) when lifted, then an engagement timeout timer is reset. If the engagement timer expires while the robot is carried, then engagement times out.

The robot retains the capability to continue its non-motion tasks while it is carried without interruption, except that gesture input is suspended. Applications individually determine how gesture input suspension is handled.

When the robot is set down in the decoupled state 772 and is no longer in the transition state 774, motion (other than via a mobility mechanism which is non-applicable in the decoupled state) is restored, and gesture input is enabled. Setting down the robot does not change its mode (engaged, self-directed, and so forth). If the robot was engaged when set down, then the engagement timeout timer is reset. If the robot was performing a task involving motion (navigation, head rotation, projector rotation, and the like) before lifting and detachment, then the robot is capable of continuing that task. Applications may individually determine how resuming a task is handled. The robot remains capable of continuing non-motion tasks.

When the robot is reattached and enters the coupled state, the robot behaves the same as in the decoupled (stationary) state 772, but further has mobility. Any mobility-related motion task or tasks may be resumed. Note however that the type of mobility mechanism may have changed, making some tasks no longer possible, e.g., the robot cannot go up or down stairs if the mobility mechanism is not able to do so, as enforced by the computational intelligence system and possibly other failsafe mechanisms. Thus, the intelligence system is configured to prevent the mobility mechanism from transporting the robot device over a terrain for which the mobility mechanism is not designed. When such a situation is encountered, applications may individually determine how to handle this situation subject to the prevented locomotion.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. For example, a general purpose remote computer described below in FIG. 8 is but one example of a computing device that may form much of the hardware and underlying software platform for a robot device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
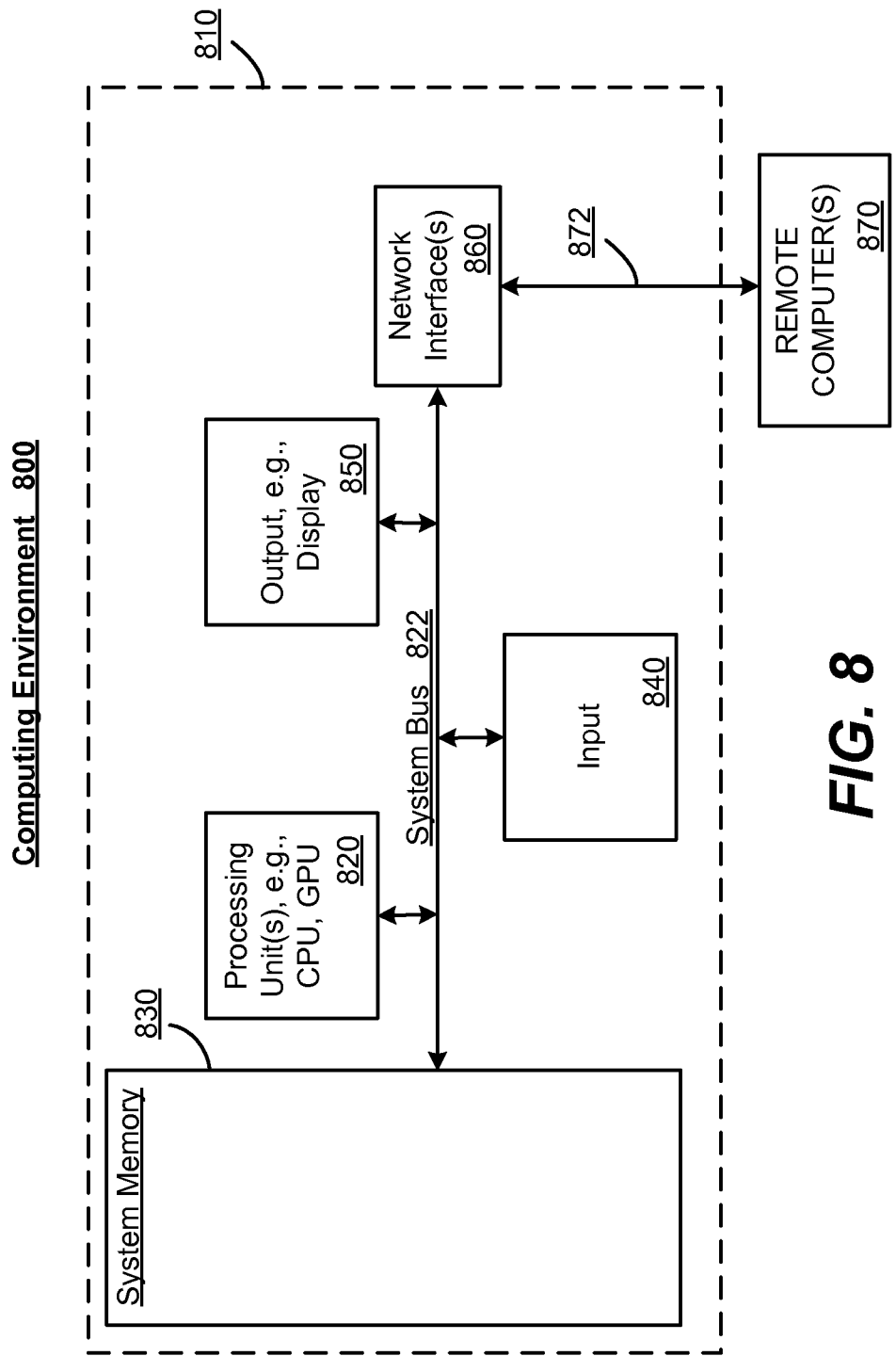
FIG. 8 is a block diagram representing an exemplary non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the exemplary computing system environment 800.

With reference to FIG. 8, an exemplary remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a robotic device comprising:
   a plurality of interchangeable mobility mechanisms of different types corresponding to different kinds of locomotion or other movement, or both locomotion and other movement, each mobility mechanism configured to be coupled to a computational intelligence system and decoupled from the computational intelligence system at different times, each mobility mechanism configured to support and move the computational intelligence system based upon instructions from the computational intelligence system;
   the computational intelligence system configured with a processor, a memory and an interface, the computational intelligence system configured to provide instructions that drive a mobility mechanism when coupled to that mobility mechanism, and to operate in a stationary state including to output information to a human via the interface when decoupled from any mobility mechanism; and
   a sensor set coupled to the intelligence system to provide one or more signals to the computational intelligence system by which the computational intelligence system detects whether a mobility mechanism is coupled or not.

2. The robotic device of claim 1 wherein when a mobility mechanism is coupled, the intelligence system further detects based upon the one of more signals which type of mobility mechanism is attached.

3. The robotic device of claim 2 wherein the intelligence system is configured to prevent the mobility mechanism from moving the robot device over a terrain for which the mobility mechanism is not designed.

4. The robotic device of claim 1 wherein the sensor set comprises a mechanical, electrical, optical or magnetic sensor, or any combination of a mechanical, electrical, optical or magnetic sensor.

5. The robotic device of claim 1 wherein the sensor set comprises at least one sensor that provides signals to detect when the robot is being carried.

6. The robotic device of claim 1 wherein the robotic device is dimensioned to have a non-intimidating height when the computational intelligence system is coupled to an interchangeable mobility mechanism, and wherein the computational intelligence system is dimensioned to be lifted up by a human of reasonable strength for placing upon an elevated surface when decoupled from any interchangeable mobility mechanism.

7. The robotic device of claim 1 wherein one of the mobility mechanisms comprises a mobility base configured to rotate a housing containing the computational intelligence system.

8. The robotic device of claim 1 wherein the computational intelligence system is coupled to a first power source, and wherein the mobility mechanism is coupled to a second power source.

9. The robotic device of claim 1 further comprising an intermediate mechanism, wherein the computational intelligence system is coupled to the mobility mechanism via the intermediate mechanism.

10. The robotic device of claim 9 wherein the intermediate mechanism includes a motor that is shared by at least two different mobility mechanisms when coupled at different times to the intermediate mechanism.

11. In a computing environment, a method performed at least in part on at least one processor, comprising:
   detecting a decoupled state of a robot device, in which the decoupled state corresponds to a computational intelligence system being decoupled from a mobility mechanism;
   detecting a coupled state of a robot device, in which the coupled state corresponds to a computational intelligence system being coupled to a mobility mechanism;
   detecting a transition state of a robot device, in which the transition state corresponds to a computational intelligence system being decoupled from a mobility mechanism and being moved by another entity; and
   operating the robot device with at least one difference in the transition state relative to each other state.

12. The method of claim 11 wherein in the transition state, operating the robot device comprises pausing or disabling, or both pausing and disabling, robot motion.

13. The method of claim 11 wherein in the transition state, operating the robot device comprises disabling at least one type of input.

14. The method of claim 11 wherein in the transition state, operating the robot device comprises timing out an engagement that was taking place before detecting the transition state if the robot device remains in the transition state beyond a timeout time, or resuming an engagement if the robot device exits the transition state before the timeout time is reached.

15. The method of claim 11 wherein in the coupled state or the decoupled state, operating the robot device comprises enabling each type of input that is disabled in the transition state.

16. The method of claim 11 wherein in the coupled state, operating the robot device comprises fully enabling robot motion.

17. The method of claim 11 wherein in the coupled state, operating the robot device comprises resuming a motion-related task.

18. The method of claim 11 wherein in the decoupled state, operating the robot device comprises enabling robot motion of at least part of a housing that contains the computational intelligence system.

19. In a computing environment, a robotic device comprising, a mobility mechanism and a computational intelligence system, the computational intelligence system configured to be coupled to the mobility mechanism and decoupled from the mobility mechanism, the computational intelligence system configured to operate in a stationary state when decoupled from the mobility mechanism, to operate in a transition state when decoupled from the mobility mechanism and being moved, and to operate in a coupled state in which the mobility mechanism is configured to support and move the computational intelligence system based upon instructions from the computational intelligence system.

20. The robotic device of claim 19 wherein the computational intelligence system is contained in a housing configured for controlled movement that is independent of movement of the housing caused by driving of the mobility mechanism, and wherein the controlled movement is disabled while in the transition state and enabled while in the decoupled state.

* * * * *